(12) United States Patent
Kumon et al.

(10) Patent No.: US 6,970,129 B2
(45) Date of Patent: Nov. 29, 2005

(54) RADAR APPARATUS, AND PROGRAM THEREFOR

(75) Inventors: Hiroaki Kumon, Kariya (JP); Yukimasa Tamatsu, Okazaki (JP)

(73) Assignee: Denso Corporation, Kariya (JP)

( * ) Notice: Subject to any disclaimer, the term of this patent is extended or adjusted under 35 U.S.C. 154(b) by 126 days.

(21) Appl. No.: 10/737,749

(22) Filed: Dec. 18, 2003

(65) Prior Publication Data

US 2004/0125011 A1    Jul. 1, 2004

(30) Foreign Application Priority Data

Dec. 24, 2002 (JP) ............................. 2002-372583

(51) Int. Cl.⁷ ............................................. G01S 13/93
(52) U.S. Cl. ...................... 342/70; 342/109; 342/115; 342/128; 342/192; 342/195
(58) Field of Search ............................. 342/70, 71, 72, 342/109, 111, 115, 192, 195, 128

(56) References Cited

U.S. PATENT DOCUMENTS

| | | | |
|---|---|---|---|
| 5,731,778 A | | 3/1998 | Nakatani et al. |
| 5,751,240 A | * | 5/1998 | Fujita et al. ............... 342/70 |
| 5,963,162 A | | 10/1999 | Mochizuki et al. |
| 6,741,204 B2 | * | 5/2004 | Kumon et al. ............ 342/70 |

FOREIGN PATENT DOCUMENTS

| | | |
|---|---|---|
| EP | 0527443 | 2/1993 |
| JP | 55-143475 | 11/1980 |
| JP | 5-40169 | 2/1993 |
| JP | 5-142338 | 6/1993 |
| JP | 5-150035 | 6/1993 |
| JP | 5-333143 | 12/1993 |
| JP | 9-152477 | 6/1997 |
| JP | 11-38129 | 2/1999 |
| JP | 11-271432 | 10/1999 |

* cited by examiner

Primary Examiner—Ian J. Lobo
(74) Attorney, Agent, or Firm—Posz Law Group, PLC

(57) ABSTRACT

Provided is a radar apparatus capable of continuously and stably making a detection of a target even if a reflected wave from a target already detected falls into obscurity due to the presence of low-frequency noises or reflected waves from other targets. An estimated value of information on a target to be obtained when the target is detected in the present cycle are acquired from the target detected in a previous cycle. When a peak compatible with the estimated value is detected in only one of a frequency-rising section and a frequency falling section of a radar wave, if the frequency of the non-detected peak pertains a low-frequency noise domain or if a side-by-side travel flag is set with respect to the target detected in the previous cycle, the non-detected peak is considered as buried by low-frequency noises or peaks of other targets, and a peak pair corresponding to the detected target is extrapolated.

6 Claims, 9 Drawing Sheets

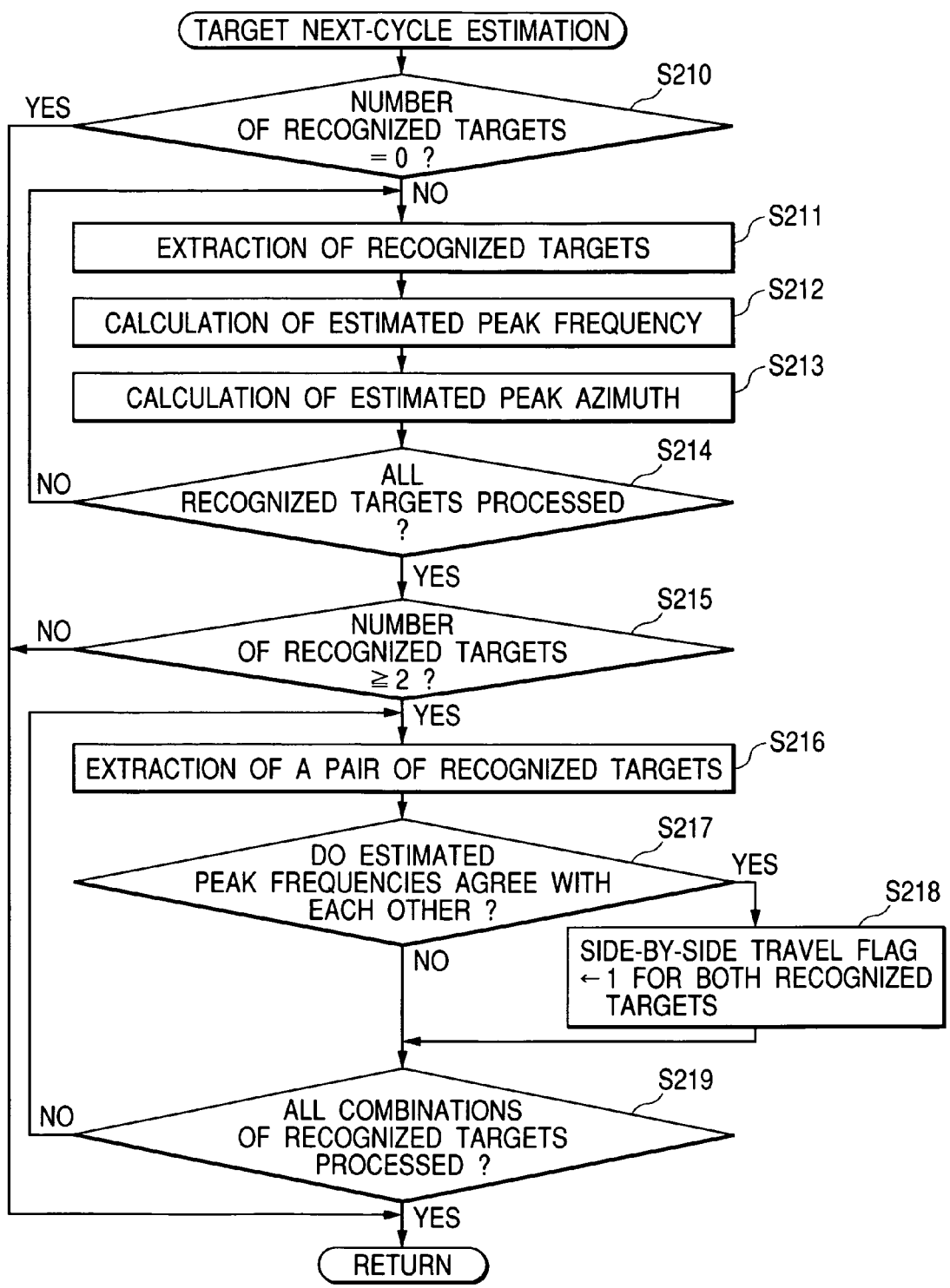

—— RISING SECTION
------- FALLING SECTION

RADAR APPARATUS, AND PROGRAM THEREFOR

BACKGROUND OF THE INVENTION

1) Field of the Invention

The present invention relates to a radar apparatus designed to process a beat signal forming a mixture of transmitted and received signals on a radar wave for detecting a target which has reflected the radar wave.

2) Description of the Related Art

So far, an FMCW type radar using a millimetric-wave band (which will be referred to hereinafter as an "FMCW radar") has been known as one of vehicle-mounted radars applicable to, for example, an inter-vehicle distance control apparatus made to detect a vehicle (preceding vehicle) existing in a forward direction for maintaining the inter-vehicle distance properly with respect thereto or an inter-vehicle distance alarm apparatus made to make a notification to the driver when the inter-vehicle distance becomes shorter than a predetermined distance.

This FMCW radar uses a radar wave modulated such that the frequency increases and decreases (rises and falls) linearly with the passage of time to form a triangular waveform, and acquires information about a radar wave reflecting target on the basis of a beat signal obtained by mixing the transmitted wave on the radar wave and the received signal on the radar wave (reflected wave) from the target.

Concretely, with respect to a rising section (zone) in which the radar wave frequency increases and a falling section in which it decreases, the frequency analysis processing, represented by the fast Fourier transform, is conducted on the beat signal, thereby obtaining a power spectrum in each section of the beat signal. Moreover, the peak frequency components extracted from the power spectrums are properly combined in the both sections and the frequency of the combined peak frequency components (which will be referred to hereinafter as a "peak pair") is applied to a well-known equation in the FMCW radar to obtain a distance to a target specified by the peak air or a relative speed thereto.

Meanwhile, in the FMCW radar, as shown in FIGS. 9A to 9C, a noise occurs in a low-frequency region of a beat signal due to the reflection at a short distance from a radome or the like mounted at an opening portion for the output/input of a radar wave, the coupling between transmission/reception antennas, or the like.

For this reason, if a peak develops in a region NA in which the low-frequency noise occurs (which will be referred to hereinafter as a "low-frequency noise region"), difficulty is experienced in extract this peak (see FIG. 9B), which makes it difficult to detect a target which has produced the peak.

As the countermeasures against this, there has been proposed an apparatus designed such that the switching of a transmitted signal or received signal is made at approximately several MHz to generate a frequency component of a beat signal in an intermediate frequency band non-susceptible to the influence of the low-frequency noise for, in this state, converting the beat signal into a proper frequency after removing the low-frequency noise (for example, see Japanese Patent Laid-Open No. HEI 5-40169.

However, in this apparatus, in addition to the employment of the configuration of the FMCW radar, there is a need to use an oscillator, mixer, filter and other devices for production and processing of a signal in an intermediate frequency band, which leads to the complication and size-expansion of the apparatus and, hence, an increase in manufacturing cost.

In addition, in the case of tracking a preceding vehicle through the use of the FMCW radar, if the tracked preceding vehicle gets between roadside things or travels side by side with another preceding vehicle, on the power spectrum, the peak stemming from the tracked preceding vehicle falls into obscurity due to the peaks from the roadside things or the other preceding vehicles, as in the case of the low-frequency noise, difficulty is encountered in detecting this peak from the tracked preceding vehicle.

Add to it that, because the peaks from the roadside things or the other preceding vehicles do not always develop in a constant frequency band unlike the flow-frequency noise, the apparatus disclosed in the aforesaid document cannot cope with such a situation.

SUMMARY OF THE INVENTION

The present invention has been developed in order to solve these problems, and it is therefore an object of the invention to provide a radar apparatus capable of stably and continuously detecting a target even if a reflected wave (peak frequency component) from a target already detected falls into obscurity due to the presence of low-frequency noises or reflected waves from other targets.

For this purpose, a radar apparatus according to the present invention comprises peak detection means which detects a peak frequency component, whose signal intensity shows a peak, from a beat signal obtained by mixing a transmitted signal of a radar wave, having a rising section where the frequency increases gradually and a falling section where the frequency decreases gradually, and a received signal of the radar wave reflected from a target.

Moreover, a peak pair extraction means extracts, from temporary peak pairs obtained by arbitrarily combining peak frequency components in the rising section detected by the peak detection means and peak frequency components in the falling section detected thereby, a temporary peak pair comprising a pair of peak frequency components based on reflected waves from the same target as a peak pair. Still moreover, the information about the target specified by the peak pair extracted by the peak pair extraction means is obtained in each predetermined measurement cycle.

In particular, according to the present invention, estimation means obtains each of estimated values of a pair of peak frequency components to be detected in the present measurement cycle with respect to each of previous-cycle targets specified in the previous measurement cycle and, when only the peak frequency component corresponding to one of the pair of estimated values obtained is detected by the peak frequency detection means, a decision means makes a decision as to whether the other estimated value satisfies a preset extrapolation condition. If it satisfies the extrapolation condition, extrapolation means extrapolates the peak pair on the assumption that the peak pair corresponding to the previous-cycle target is detected as the estimated values obtained by the estimation means.

In this connection, except that a relative speed to the target takes zero, the peak frequency components to be detected in the rising section and the falling section on the basis of a reflected wave from that target differ from each other. Therefore, even if a peak frequency component is not detectable in one frequency band, there is a high probability that a peak frequency component is detected in one of the rising and falling sections.

That is, according to the present invention, even in a case in which a peak frequency component corresponding to only one of a pair of estimated values is detectable, if the non-detectable peak frequency component meets an extrapolation condition and it previously turns out that the peak frequency component will not be detected, it is processed as having been detected. This enables stable target detection.

In this connection, for example, it is also appropriate that the decision that the extrapolation condition is satisfied is made when an estimated value being an object of decision lies in a frequency domain in which a low-frequency noise occurs, or that the decision indicative of the satisfaction of the extrapolation condition is made when the estimated value to be decided overlaps with an estimated value on another previous-cycle target obtained by the estimation means.

Moreover, preferably, in a case in which a plurality of channels each comprising a transmitting antenna and a receiving antenna exist and a beat signal is obtainable for each channel, in obtaining an azimuth (direction) angle of a target specified by a peak pair extrapolated by the extrapolation means, the actual azimuth angle is obtained on the basis of one peak frequency component detected in each channel. In this case, even for the target specified by the extrapolated peak pair, the information on the azimuth angle is accurately obtainable.

Furthermore, the radar apparatus according to the present invention can continuously detect, for example, an approaching target up to the collision moment without losing halfway and, hence, it can be mounted on a vehicle to be suitable for use in the inter-vehicle distance control, pre-crush control, and the like.

Meanwhile, the respective means constituting the aforesaid radar apparatus can also be constructed in the form of a computer operating program.

In this case, this program is stored in a computer-readable recording medium and is loaded into a computer system and activated when needed. This recording medium can be of a portable type, or of a type incorporated into the computer system. Moreover, the program can also be of a type loaded in the computer system through a network.

BRIEF DESCRIPTION OF THE DRAWINGS

Other objects and features of the present invention will become more readily apparent from the following detailed description of the preferred embodiment taken in conjunction with the accompanying drawings in which:

FIG. 8 is a flow chart showing the contents of target next-cycle estimation to be implemented in the main processing.

DESCRIPTION OF THE PREFERRED EMBODIMENTS

An embodiment of the present invention will be given hereinbelow with reference to the drawings.

Figure 1:
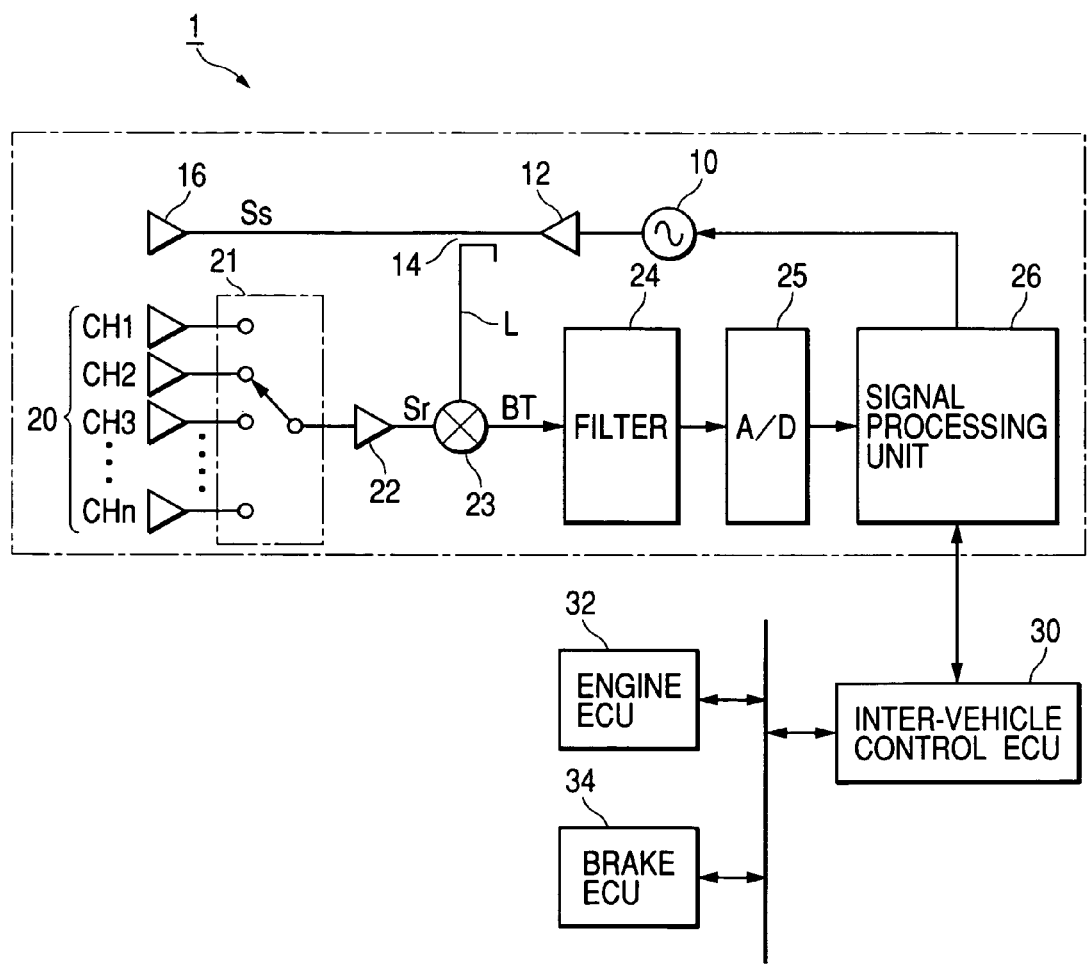
FIG. 1 is a block diagram showing the outline of a configuration of a cruise control system to which the present invention is applicable.

FIG. 1 is a block diagram showing the outline of a configuration of a cruise control system based upon the present invention.

In FIG. 1, the cruise control system is made up of an inter-vehicle control electronic control unit (which will be referred to hereinafter as an "inter-vehicle control ECU") 30, and engine electronic control unit (which will be referred to hereinafter as an "engine ECU") 32 and a brake electronic control unit (which will be referred to hereinafter as a "brake ECU") 34, which are connected through LAN communication buses to each other. Moreover, each of the ECUs 30, 32 and 34 is based on a well-known microcomputer and is equipped with at least a bus controller for making communications through the LAN communication buses. Incidentally, in this embodiment, the data communications among the ECUs are made through the use of a CAN ("Controller Area Network" proposed by Robert Bosch Co., Ltd. in German) protocol which has generally been employed in a vehicle-mounted network.

In addition, although not shown, to the inter-vehicle control ECU 30, there are connected a warning buzzer, a cruise control switch, a target inter-vehicle setting switch, and others, and further connected a radar sensor 1 corresponding to a radar apparatus according to the present invention.

In this case, the radar sensor 1 is constructed as a so-called FMCW type "millimetric radar", and is designed to transmit/receive a frequency-modulated radar wave in a millimetric wave band for recognizing a target such as a preceding vehicle or a roadside thing so that, for example, preceding vehicle information forming information on the target (recognized target) recognized thereby and diagnosis information on the radar sensor 1 itself are produced and transmitted to the inter-vehicle control ECU 30. This preceding vehicle information includes, in addition to a relative speed to a recognized target and a position of the recognized target (distance data and lateral position data), a one's-lane probability indicative of a probability that a recognized target exists on an estimated traveling lane of the one's vehicle (this vehicle), a vehicle certainty indicative of the degree of certainty of the recognized target being a vehicle, and other information.

The brake ECU 34 makes a decision on a brake pedal state on the basis of information from an M/C pressure sensor in addition to detection information (steering angle, yaw rate) from a steering sensor and a yaw rate sensor, and transmits the brake pedal state through the LAN communication bus to the inter-vehicle control ECU 30 and, on the basis of the brake pedal state, controls a brake actuator made to open and close pressure-increasing control valve/pressure-decreasing control valve provided in a brake hydraulic circuit for controlling the braking force.

The engine ECU 32 transmits detection information (vehicle speed, engine control state, accelerator operating state) from a vehicle speed sensor, a throttle opening-degree sensor and an accelerator opening-degree sensor to the inter-vehicle control ECU 30, and receives a target acceleration, a fuel cut request, diagnosis information and others from the inter-vehicle control ECU 30 to output a drive instruction to, for example, an throttle actuator for adjusting the throttle opening degree of an internal combustion engine (in this case, an gasoline engine) in accordance with a driving state specified or determined on the basis of the received information.

For example, the inter-vehicle control ECU 30 receives the present vehicle speed and the engine control state from the engine ECU 32, and receives a control state such as the steering angle, the yaw rate and the brake control from the brake ECU 34. Moreover, it determines a preceding vehicle forming an object of the inter-vehicle distance control on the basis of the preceding vehicle information received from the radar sensor 1 and, on the basis of detection signals from the cruise control switch and the target inter-vehicle setting switch, transmits, as control instruction values for the appropriate adjustment of the inter-vehicle distance to the preceding vehicle, a target acceleration, a fuel cut request, diagnosis information and other information to the engine ECU 32, and further the target acceleration, a brake request and others to the brake ECU 34. Still moreover, the inter-vehicle control ECU 30 makes a decision on the issue of an alarm and, when needed, sounds the warning buzzer.

Furthermore, the radar sensor 1 is made up of an oscillator (VCO) 10 for generating a radio-frequency signal in a millimetric-wave band modulated to have a rising section (zone) where its frequency increases linearly with time and a falling section where its frequency decreases linearly with time, an amplifier 12 for amplifying the radio-frequency signal from the oscillator 10, a distributor 14 for carrying out the power distribution of an output of the amplifier 12 to a transmission signal Ss and a local signal L, an transmitting antenna 16 for emitting a radar wave corresponding to the transmission signal Ss, and a reception side antenna unit 20 including n receiving antennas for receiving the radar wave.

Still furthermore, the radar sensor 1 is equipped with a reception switch 21 for sequentially selecting one of the antennas constituting the reception side antenna unit 20 to supply a received signal Sr from the selected antenna to the latter stage, an amplifier 22 for amplifying the received signal Sr from the reception switch 21, a mixer 23 for mixing the received signal Sr amplified by the amplifier 22 and the local signal L to produce a beat signal BT, a filter 24 for removing unnecessary signal components from the beat signal BT produced by the mixer 23, an A/D converter 25 for sampling an output of the filter 24 for the conversion into digital data, a signal processing unit 26 for controlling the activation/stop of the oscillator 10 and the sampling of the beat signal BT in the A/D converter 25, and for conducting the signal processing using the sampled data and the communication with the inter-vehicle control ECU 30 and further for implementing, for example, the processing to transmit/receive the information (vehicle speed, radius of curvature of a curve) needed for the signal processing, the information (preceding vehicle information, diagnosis information, and others) obtained as the results of the signal processing.

Each of the antennas constituting the reception side antenna unit 20 is set such that its beam width covers the entire beam width of the transmitting antenna 16, and the respective antennas are allocated to channels CH1 to CHn, respectively.

The signal processing unit 26 is based on a well-known microcomputer and is equipped with an arithmetic processing unit (for example, DSP) for conducting the fast Fourier transform (FFT) on the data inputted through the A/D converter 25.

In the radar sensor 1 thus constructed according to this embodiment, when the oscillator 10 is activated in accordance with an instruction from the signal processing unit 26, a radio-frequency signal produced by the oscillator 10 and amplified by the amplifier 12 is power-distributed by the distributor 14 to produce a transmission signal Ss and a local signal L, and of these signals, the transmission signal Ss is transmitted as a radar wave through the transmitting antenna 16.

A radar wave (reflected wave) transmitted from the transmitting antenna 16 and reflected by a target is received by all the receiving antennas organizing the reception side antenna unit 20, and only the received signal Sr in the reception channel CHi (i=1 to n) selected by the reception switch 21 is amplified by the amplifier 22 and then supplied to the mixer 23. This mixer 23 mixes the received signal Sr and the local signal L from the distributor 14 to produce a beat signal BT. After undergoing the removal of unnecessary signal components in the filter 24, this beat signal BT is sampled by the A/D converter 25 and inputted to the signal processing unit 26.

The reception switch 21 performs the switching action to select each of all the channels CH1 to CHn predetermined times (512 times) during one modulation cycle of the radar wave, and the A/D converter 25 carries out the sampling in synchronism with the switching timing. That is, within one modulation cycle of the radar wave, sampled data are stored for each of the channels CH1 to CHn and each of the radar wave rising and falling sections.

Figure 2:
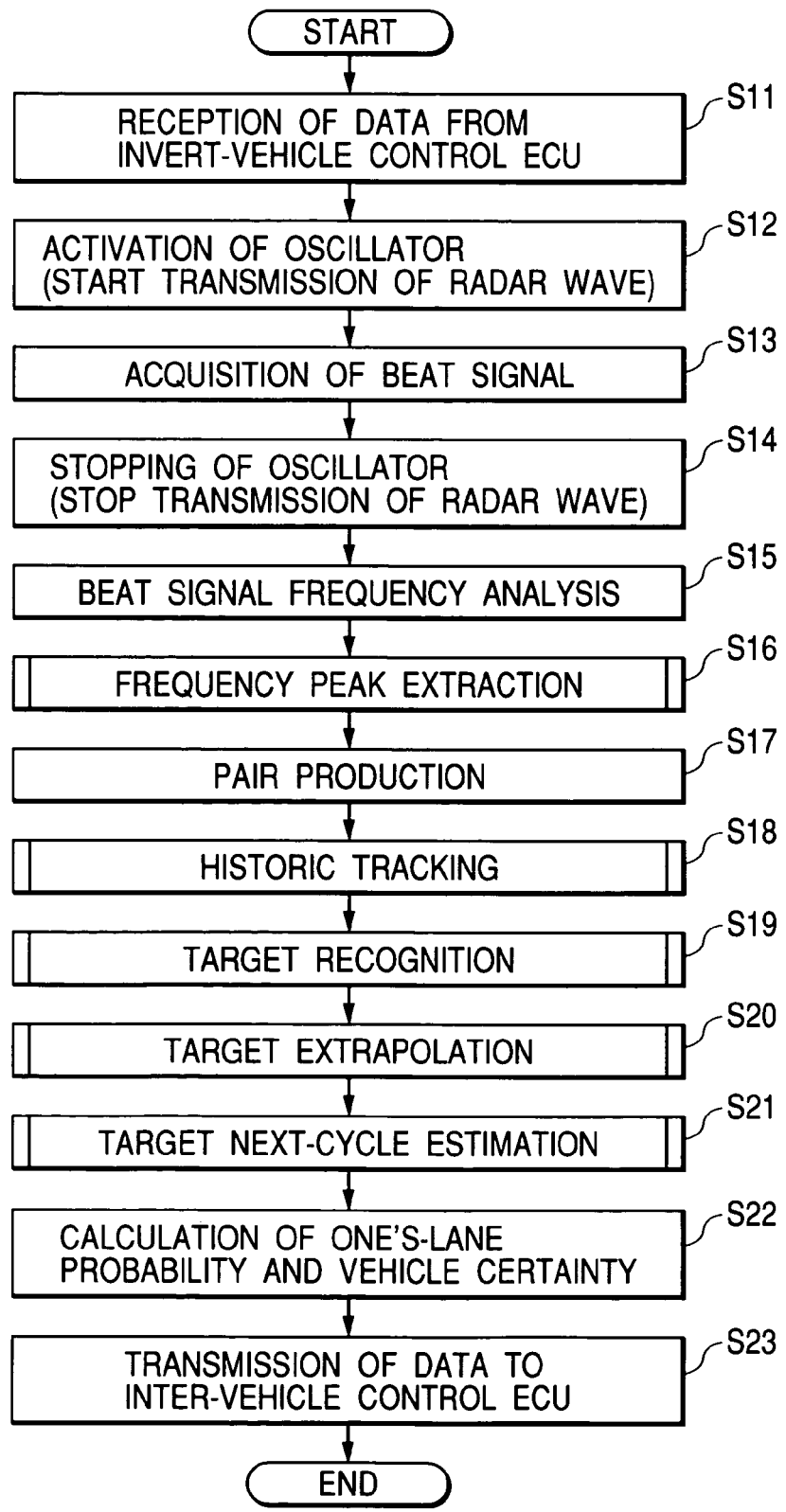
FIG. 2 is a flow chart showing the contents of processing to be implemented in a signal processing unit of a radar sensor according to an embodiment of the present invention.

Referring to a flow chart of FIG. 2, a description will be given hereinbelow of a main processing to be implemented in the signal processing unit 26 of the radar sensor 1.

In this processing, when receiving the information on the present vehicle speed and the radius of curvature of a curve from the inter-vehicle control ECU 30 (step S11), the signal processing unit 26 activates the VCO 10 to start the transmission of a radar wave (S12) and acquires sampled values of a beat signal BT through the A/D converter 25 (S13) and, after the acquisition of enough sampled values, stops the VCO 10 to suspend the radar wave transmission (S14).

Following this, the frequency analysis processing (in this case, FFT processing) is conducted on the acquired sampled values and a power spectrum of a beat signal BT is obtained for each of the channels CH1 to CHn and for each of the rising and falling sections (S15). On the basis of the power spectrums thus obtained, the signal processing unit 26 carries out frequency peak extraction (S16), pair production (S17), historic tracking (S18), target recognition (S19), target extrapolation (S20) and target next-cycle estimation (S21). In addition, the signal processing unit 26 calculates a one's-lane probability and a vehicle certainty on the basis of the speed, position, azimuth angle and width of the recognized target obtained as the results of these processing and the radius of curvature of the curve obtained in the step S11, and others (S22), and transmits to the inter-vehicle control ECU 30 the preceding vehicle information including the speed, position, one's-lane probability and vehicle certainty (S23). Thereafter, this processing comes to an end.

Incidentally, the calculations of the one's-lane probability and the vehicle certainty in the step S22 are not directly related to the essential features of the present invention, and the description thereof will be omitted for brevity.

A detailed description will be given hereinbelow of the processing to be implemented in the steps S16 to S21.

Figure 3:
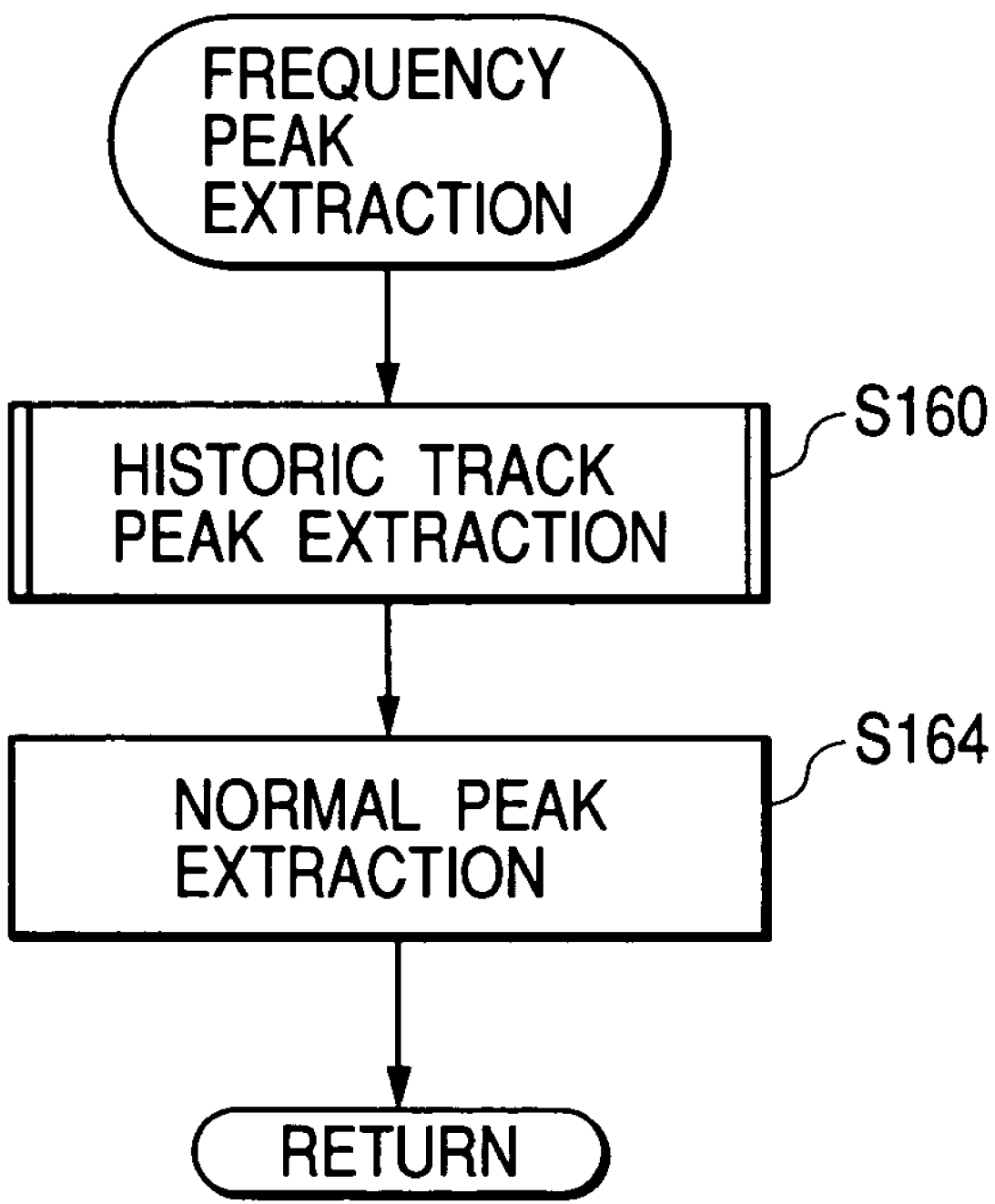
FIG. 3 is a flow chart showing the contents of frequency peak extraction to be implemented in a main processing according to the embodiment.

First of all, in the frequency peak extraction in the step S116, a historic track peak extraction (S160) and a normal peak extraction (S164) are executed as shown in a flow chart of FIG. 3.

Figure 4:
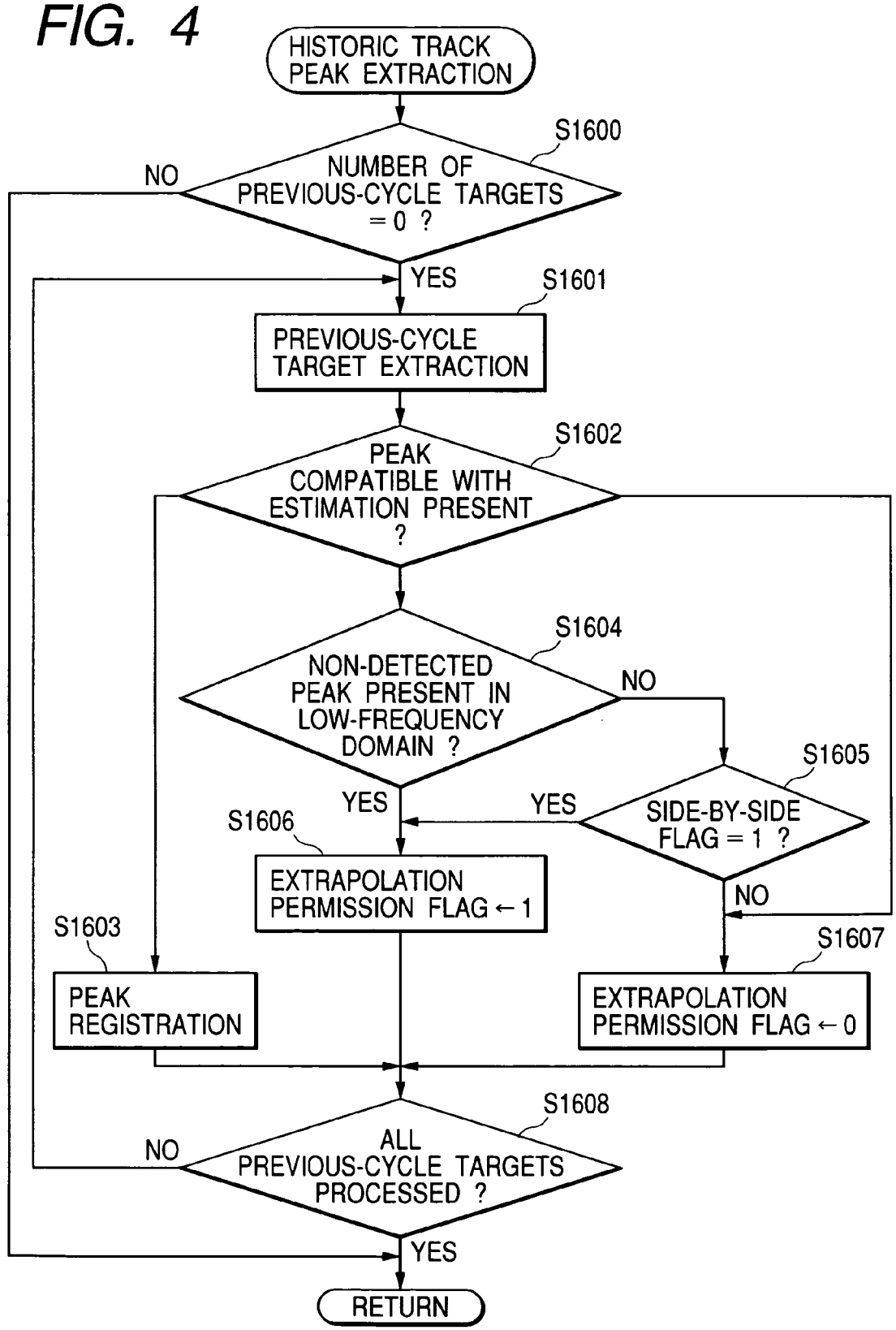
FIG. 4 is a flow chart showing the contents of historic track peak extraction to be implemented in the frequency peak extraction.

In the historic track peak extraction in the step S160, as shown in a flow chart of FIG. 4, a decision is made as to whether or not the number of recognized targets (which will be referred to hereinafter as "previous-cycle targets") specified in a previous (last) measurement cycle (which will be referred to hereinafter as a "previous cycle") is zero (S1600). If the number of previous-cycle targets is zero, this processing reaches termination. On the other hand, if it is not zero, one of the previous-cycle targets is extracted (S1601), and on the basis of an estimated value (calculated in the step S21 of the previous cycle) of the information (relative speed, distance, azimuth) to be obtained when the extracted previous-cycle target is detected in the present measurement cycle (which will be referred to hereinafter as a "present cycle"), a decision is made as to whether or not a peak frequency component compatible with this estimated value exists on the power spectrum obtained in the step S15 (S1602). In this case, the "compatible" signifies the agreement in a preset allowable range (and so forth).

In a case in which peaks (peak frequency components) compatible with an estimated value are detected in both the rising and falling sections, these two peaks are registered (peak registration) (S1603).

On the other hand, if a peak compatible therewith is detected in only one of the rising and falling sections, a decision is made as to whether or not the frequency of the non-detected peak pertains to a frequency domain NA in which a low-frequency noise occurs (S1604). If it does not pertain thereto, a decision is made as to whether or not a side-by-side travel flag (which will be mentioned later) is set with respect to the previous-cycle target (S1605).

In a case in which the frequency of the non-detected peak lies in the low-frequency noise domain NA or if the side-by-side travel flag is set, it is considered that the non-detected peak falls into obscurity due to (is buried by) the low-frequency noises or the peaks of other targets, and an extrapolation permission flag for the previous-cycle target extracted in the step S1601 is set (S1606).

On the other hand, if the peak compatible with the estimated value is not detected in both the rising and falling sections, or if the peak is detected in only one of both the sections and the non-detected peak does not pertain to the low-frequency noise domain NA and the side-by-side travel flag is not set, the extrapolation permission flag for the previous-cycle target extracted in the step S1601 is made clear (S1607).

After the completion of the peak registration in the step S1603 and the setting of the extrapolation permission flag in the steps S1606 and S1607 in this way, a decision is made as to whether or not the above-mentioned processing (S1601 to S1607) are implemented with respect to all the previous-cycle targets (S1608). If non-processed previous-cycle targets still remain, the operational flow returns to the step S1601 to carry out the like processing with respect to the non-processed previous-cycle target. On the other hand, if the processing on all the previous-cycle targets reaches completion, this processing comes to an end.

Following this, the operational flow returns to the normal peak extraction in FIG. 3. In this normal peak extraction in the step S165, of the peaks on an average power spectrum obtained by averaging the power spectrums obtained on each channel and in each section in the step S15, the peaks which are other than the peaks extracted in the historic track peak extraction and whose power value is larger than a preset threshold PTSD undergo the peak registration.

That is, the peak registration is made with respect to the peaks detected as the estimated values obtained from the previous-cycle target and the peaks detected from the averaged power spectrum and larger in power value than the threshold PTSD. Concurrently with this, in a case in which, with respect to the previous-cycle target on which the peak is detected as the estimated value in only one section, there is a possibility that the non-detected peak is buried by the low-frequency noises or the peaks of the other targets, the extrapolation permission flag is set.

Subsequently, in the pair production in the step S17, combinations of peaks at the rising modulation and peaks at the falling modulation are set on the basis of the peaks registered through the frequency peak extraction. Moreover, from the set combinations, extracted are the combinations each having a power difference between both the peaks smaller than a preset power difference threshold PDIF and an angle difference between both the peaks smaller than a preset angle difference threshold ADIF. Still moreover, the distance, the lateral position and the relative speed are calculated with respect to each of the extracted combinations, and only the combinations satisfying that the calculated distance is shorter than a preset upper limit distance DMAX and the calculated speed is higher than a preset lower limit speed VMIN but lower than a preset upper limit speed VMAX are registered as proper pairs.

A detection counter is allocated to each of the pairs registered through the pair production and the counter value CNTi thereof is set at zero.

Figure 5:
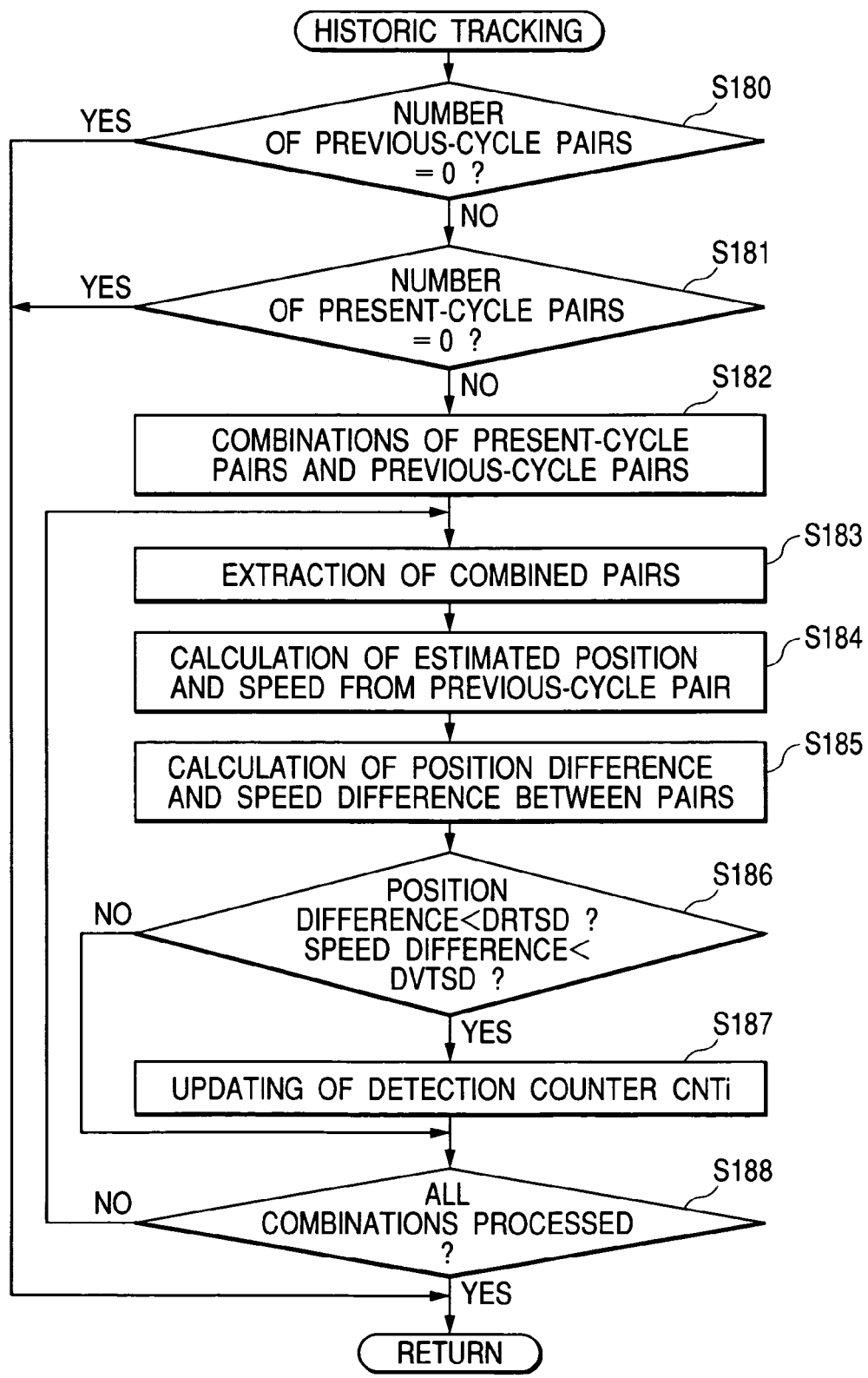
FIG. 5 is a flow chart showing the contents of the historic tracking to be implemented in the main processing.

Moreover, in the historic tracking in the step S18, as shown in a flow chart of FIG. 5, a decision is made as to whether or not the number of pairs (which will be referred to hereinafter as "previous-cycle pairs") registered through the pair production (S17) in the previous cycle is zero (S180), and a decision is made on whether or not the number of pairs (which will be referred to hereinafter as "present-cycle pairs") registered through the pair production (S17) in the current cycle is zero (S181). If at least one is zero, this processing comes to an end.

If the number of the previous-cycle pairs is not zero and the number of present-cycle pairs is not zero, combinations of the present-cycle pairs and the previous-cycle pairs are set (S182), and one pair is extracted from the pair combinations (which will be referred to hereinafter as "combined pairs") (S183).

With respect to the extracted combined pairs, on the basis of the previous-cycle pair information, the estimated position and estimated speed of the present-cycle pair corresponding to this previous-cycle pair are calculated (S184), and a position difference and speed difference therebetween are obtained on the basis of the estimated position and the estimated speed, and the detection position and the detection speed obtained from the present-cycle pair (S185).

A decision is made as to whether or not the position difference is smaller than a preset upper limit position difference DRTSD and the speed difference is smaller than a preset upper limit speed difference DVTSD (S186). Only when the position difference is smaller than the preset upper limit position difference DRTSD and the speed difference is smaller than the preset upper limit speed difference DVTSD, the detection counter CNTi for the present-cycle pair is updated with a value obtained by adding 1 to the value of the detection counter CNTi for the previous-cycle pair (S187).

A decision is made as to whether or not the aforesaid processing (S183 to S187) has been conducted on all the combined pairs set in the step S182 (S188). If there are non-processed combined pairs, the operational flow returns to the step S183. If the processing on all the combined pairs reaches completion, this processing comes to an end.

That is, with respect to the present-cycle pair historically connected to the previous-cycle pair, the corresponding previous-cycle pair information (the count value CNTi of the detection counter) is taken over, while with respect to the present-cycle pair which does not have a historic connection with the previous-cycle pair, the count value CNTi of the detection counter remains at zero.

Figure 6:
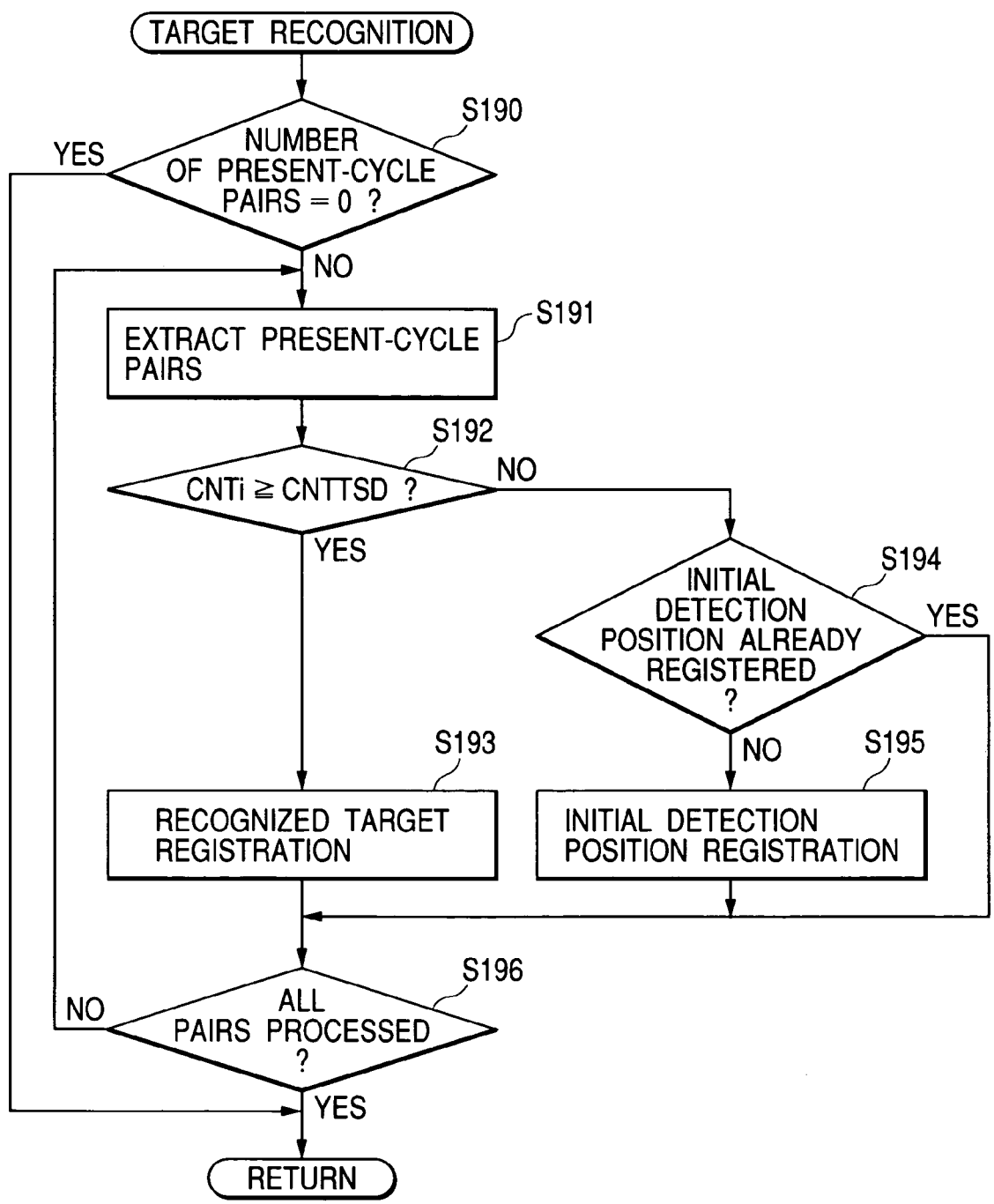
FIG. 6 is a flow chart showing the contents of target recognition to be implemented in the main processing.

In the target recognition in the step S119, as shown in a flow chart of FIG. 6, a decision is made as to whether or not the number of present-cycle pairs is zero (S190), and if it is zero, this processing comes to an end. On the other hand, if the number of present-cycle pairs is not zero, one pair is extracted from the present-cycle pairs (S191), and a decision is made as to whether or not the count value CNTi of the detection counter for the extracted present-cycle pair exceeds a preset recognition threshold CNTTSD (S192). If it exceeds the recognition threshold CNTTSD), the recognized target registration is made with respect to this present-cycle pair as a present-cycle pair representing a target (S193). At this time, to the registered recognized target, there is allocated an extrapolation counter made to count the number of times of extrapolation of a target, with the count value ICNTi thereof being set at zero.

On the other hand, if the count value CNTi of the detection counter is smaller than the recognition threshold CNTTSD, a decision is made as to whether or not the initial detection position has already be registered (S194), while if it has not been registered, the position obtained on the basis of this pair is registered as the initial detection position (S195).

Then, a decision is made as to whether or not the aforesaid processing (S191 to S195) is implemented with respect to all the present-cycle pairs (S196). If non-processed present-cycle pairs still remain, the operational flow returns to the step S191, and if the processing on all the present-cycle pairs comes to an end, this processing comes to an end.

That is, only the peak pairs exceeding the recognition threshold CNTTSD and having the historic connection are registered as recognized targets, and the position obtained from the peak pair forming the head portion of this series of historic connections is registered as the initial detection position.

Figure 7:
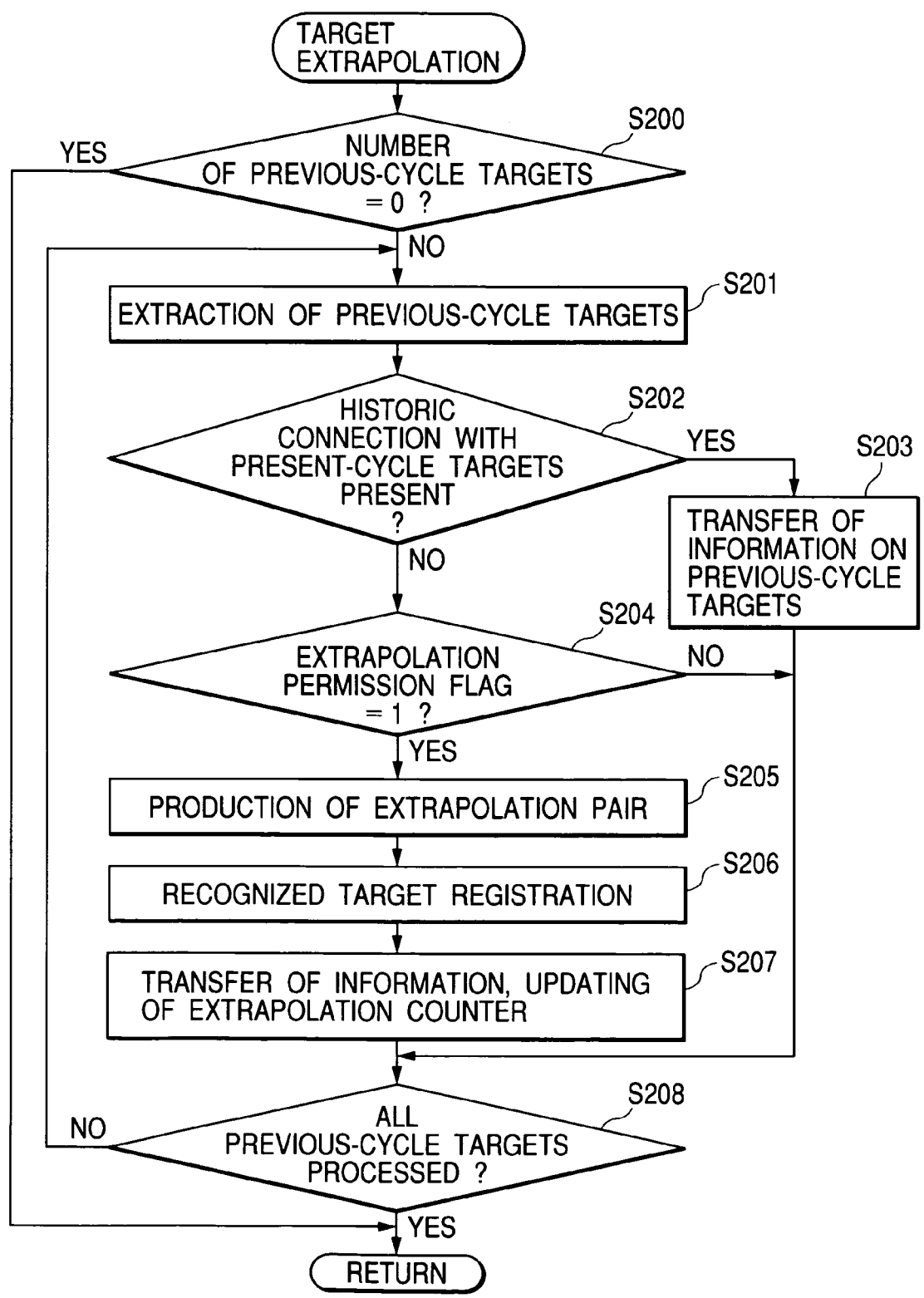
FIG. 7 is a flow chart showing the contents of target extrapolation to be implemented in the main processing.

Moreover, in the target extrapolation in the step S20, as shown in a flow chart of FIG. 7, first, a decision is made as to whether or not the number of previous-cycle targets is zero (S200), and if it is at zero, this processing comes to an end. On the other hand, if the number of previous-cycle targets is not zero, one target is extracted therefrom (S201), and a decision is made as to whether or not the extracted previous-cycle target has a historic connection with the recognized target registered in the step S193, that is, the present-cycle target (S202).

If it has the historic connection, the information (the count values of the detection counter and the extrapolation counter, the initial detection position) on this previous-cycle target is taken over by the present-cycle target (S203), and the operational flow advances to a step S208. On the other hand, if it does not have the historic connection, a decision is made as to whether or not the extrapolation permission flag for this previous-cycle target is set (S204). If the extrapolation permission flag is not in a set condition, there is no need to carry out the extrapolation and, hence, the operational flow goes to the step S208. On the other hand, if the extrapolation permission flag is set, there is a need to carry out the extrapolation and, hence, an extrapolation pair is produced on the basis of the estimated values on this previous-cycle target (S205), and the recognized target registration is made on this extrapolation pair (S206). Moreover, the information (the count values of the detection counter and the extrapolation counter, the initial detection position) on the previous-cycle target is taken over by the recognized target registered extrapolation pair, and the count value ICNTi of the extrapolation counter is updated, i.e., incremented (S207). In this connection, for example, the count value ICNTi of the extrapolation counter is used as an index representative of the certainty on the presence of a target when the vehicle is obtained in the step S22. Concretely, as the count value ICNTi becomes lower, the certainty on the presence of a target becomes higher.

Moreover, a decision is made as to whether or not the aforesaid processing (S201 to S207) is conducted with respect to all the previous-cycle targets (S208). If non-processed targets still remain, the operational flow returns to the step S201, and if the processing on all the previous-cycle targets reaches completion, this processing comes to a termination.

That is, even in a case in which the historic connection of the recognized target falls into a cutoff condition, if the recognition result up to the previous (last) cycle indicates a high probability on the actual presence of the target even in the present cycle, the peak pair is extrapolated for continuous recognition.

In addition, in the target next-cycle estimation in the step S21, as shown in a flow chart of FIG. 8, first, a decision is made as to whether or not the number of present-cycle targets, i.e., the number of recognized targets registered in the steps S193 and S207, is at zero (S210). If it is at zero, because of no target to be selected, this processing terminates.

On the other hand, if the present-cycle targets are not zero in number, one is extraction from the present-cycle targets (S211), and a peak frequency to be detected in the next cycle is obtained with the extracted present-cycle target (S212), and an azimuth angle of the target to be detected in the next cycle is obtained (S213). At this time, if the present-cycle target extracted in the step S211 is based upon the extrapolation pair, without using the information on the previous-cycle target having the historic connection for the azimuth angle, the peak of one of the extrapolation pair is actually detected and, hence, the azimuth of the target to be detected in the next cycle is obtained on the basis of the phase difference of the detected one peak in each channel.

Then, a decision is made as to whether or not the processing in the steps S212 and S213 is conducted on all the present-cycle targets (S214). If there are non-processed present-cycle targets, the operational flow returns to the step S211. On the other hand, if the processing on all the present-cycle targets reaches completion, a decision is made as to whether or not the present-cycle targets are two or more in number (S215). If the number thereof is less than two, this processing terminates.

On the other hand, if two or more present-cycle targets exist, a pair of present-cycle targets arbitrarily combined with each other are extracted (S216), and a decision is made as to whether or not the estimated values of the peak frequencies of the extracted present-cycle targets agree with each other within a preset allowable range (S217). If they agree with each other, the side-by-side travel flag is set with respect to both the present-cycle targets (S218).

Moreover, a decision is made as to whether or not the aforesaid processing (S217, S218) is implemented with respect to all the combinations of the present-cycle targets (S219). If non-processed combinations still remain, the operational flow returns to the step S216, and if the processing on all the combinations reaches completion, this processing comes to an end.

That is, in this processing, the peak frequency and azimuth (direction) to be detected in the next cycle are estimated with respect to each of the present-cycle targets, and if there is a possibility that the targets having different estimated peak frequencies overlap with each other, the extrapolation is allowed in a manner such that the side-by-side travel flag is set, thus, even if the peak is not detected as the estimated value in the next cycle, preventing the losing of the target.

Figure 9A:
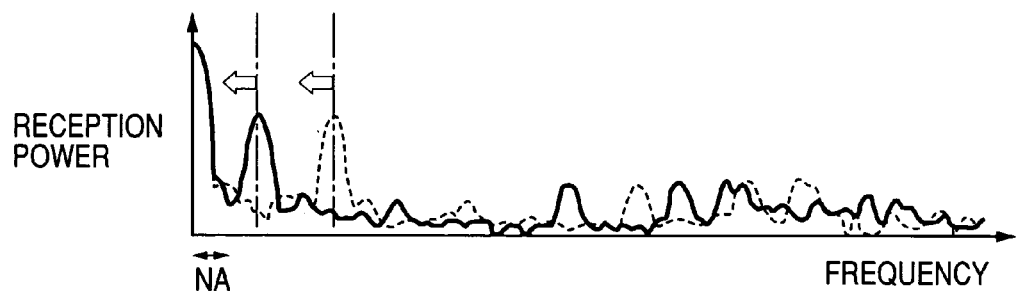
FIG. 9 is a graphic illustration of one example of a power spectrum to be measured when there is a target which comes close at a relative speed.
Figure 9B:
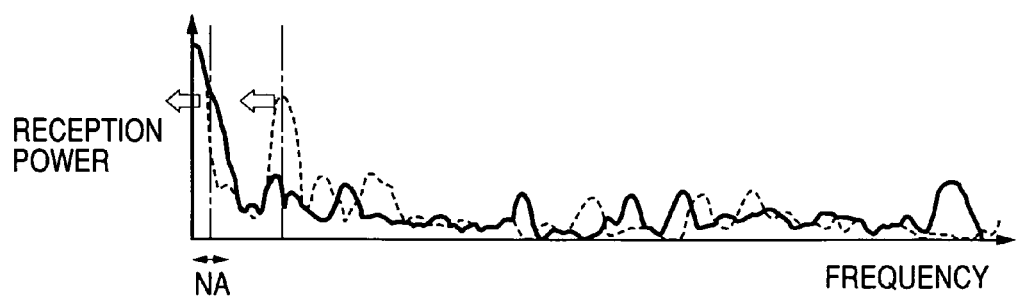
Figure 9C:
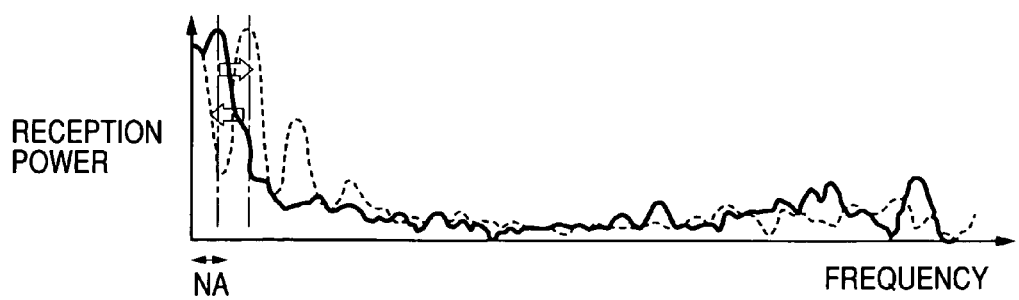

FIGS. 9A to 9C are illustrations of one example of a power spectrum to be measured when a target coming close at a relative speed (V≠0) exists.

In this case, as shown in FIG. 9A, peaks appear (are detected) at different frequencies in the rising and falling sections on the power spectrum, and both the peaks shift to the frequency decreasing side with the passage of time.

Moreover, as shown in FIG. 9B, when one peak (in this case, the rising section) enters a low-frequency noise domain NA at some point, difficulty is encountered in detecting the peak which falls into obscurity due to the presence of low-frequency noises, and only one peak becomes detectable.

At this time, since the radar sensor 1 performs the extrapolation of the peak buried by the low-frequency noises as it is detected as estimated, the target is continuously detected without being interrupted. This is not limited to the case of the low-frequency noises, but applying to a case in which a given peak is buried by the peaks of the other targets in an arbitrary frequency domain.

When the target comes closer thereafter, as shown in FIG. 9C, the peak in the rising section has a negative frequency, and returns at 0 Hz and changes to come out of the low-frequency noise domain NA so that the peak again becomes detectable.

As described above, in the radar sensor 1, with respect to the target which has continuously been detected for a given period of time, even if, of the estimated values of a peak pair to be detected in the present cycle, the peak corresponding to one estimated value is not detected, when it is previously known that there is a possibility that the non-detected peak is not detected because of being buried by the low-frequency noises and the peaks of the other targets, the extrapolation is made on the assumption that the peak is detected as the estimated value.

Accordingly, in the radar sensor 1, unlike the conventional apparatus, a target can continuously and stably be detected without conducting complicated processing such as converting a beat signal into an intermediate frequency for removing the low-frequency noises. Add to it that, since the radar sensor 1 can cope with a situation in which a peak is buried not only by low-frequency noises but also by peaks of other targets, a more stable target detection becomes feasible, as compared with the conventional apparatus.

In addition, with the radar sensor 1, even in a case in which the peak pair extrapolation is made, since one peak is detected and the azimuth angle is obtained on the basis of the frequency component of the one peak, in particular, of the information on the present-cycle targets obtained on the basis of the extrapolation pair, accurate information on the azimuth angle is obtainable.

In this embodiment, the steps S112 to S116 correspond to the peak detection means, the steps S17 to S19 correspond to the peak pair extraction means, the step S21 corresponds to the estimation means, the steps S1604 to S1607 correspond to decision means, and the steps S204 to S207 correspond to the extrapolation means.

It should be understood that the present invention is not limited to the above-described embodiment, and that it is intended to cover all changes and modifications of the embodiment of the invention herein which do not constitute departures from the spirit and scope of the invention.

What is claimed is:

1. A radar apparatus comprising:
    peak detection means for detecting a peak frequency component, whose signal intensity shows a peak, from a beat signal obtained by mixing a transmitted signal of a radar wave, having a rising section where its frequency increases gradually and a falling section where its frequency decreases gradually, and a received signal of the radar wave reflected from a target;
    peak pair extraction means for extracting, from temporary peak pairs obtained by arbitrarily combining peak frequency components in the rising section detected by said peak detection means and peak frequency components in the falling section detected thereby, a temporary peak pair comprising a pair of peak frequency components based on reflected waves from the same target as a peak pair, with information about a target specified by said peak pair extracted by said peak pair extraction means being obtained in each predetermined measurement cycle;
    estimation means for obtaining each of estimated values of a pair of peak frequency components to be detected in the present measurement cycle with respect to each of previous-cycle targets specified in a previous measurement cycle;
    decision means for, when only the peak frequency component corresponding to one of the pair of estimated values is detected by said peak detection means, making a decision as to whether the other estimated value satisfies a predetermined extrapolation condition; and
    extrapolation means for, when said decision means shows that the other estimated value satisfies said extrapolation condition, making a peak pair extrapolation on the assumption that a peak pair corresponding to said previous-cycle target is detected as the estimated values obtained by said estimation means.

2. The apparatus according to claim 1, wherein, when the estimated value being an object of decision lies in a frequency domain in which a low-frequency noise occurs, said decision means makes a decision that the other estimated value satisfies said predetermined extrapolation condition.

3. The apparatus according to claim 1, wherein, when the estimated value being an object of decision overlaps with an estimated value on another previous-cycle target obtained by said estimation means, said decision means makes a decision that the other estimated value satisfies said predetermined extrapolation condition.

4. The apparatus according to claim 1, wherein an azimuth angle of a target specified from the peak pair extrapolated by said extrapolation means is obtained on the basis of the detected one peak frequency component.

5. The apparatus according to claim 1, wherein the apparatus is mounted in a vehicle.

6. A program for making a computer function as:
    peak detection means for detecting a peak frequency component, whose signal intensity shows a peak, from a beat signal obtained by mixing a transmitted signal of a radar wave, having a rising section where its frequency increases gradually and a falling section where its frequency decreases gradually, and a received signal of the radar wave reflected from a target;

peak pair extraction means for extracting, from temporary peak pairs obtained by arbitrarily combining peak frequency components in the rising section detected by said peak detection means and peak frequency components in the falling section detected thereby, a temporary peak pair comprising a pair of peak frequency components based on reflected waves from the same target as a peak pair, with information about a target specified by said peak pair extracted by said peak pair extraction means being obtained in each predetermined measurement cycle;

estimation means for obtaining each of estimated values of a pair of peak frequency components to be detected in the present measurement cycle with respect to each of previous-cycle targets specified in a previous measurement cycle;

decision means for, when only the peak frequency component corresponding to one of the pair of estimated values is detected by said peak detection means, making a decision as to whether the other estimated value satisfies a predetermined extrapolation condition; and extrapolation means for, when said decision means shows that the other estimated value satisfies said extrapolation condition, making a peak pair extrapolation on the assumption that a peak pair corresponding to said previous-cycle target is detected as the estimated values obtained by said estimation means.

* * * * *